United States Patent
O'Neill

(10) Patent No.: US 6,454,116 B1
(45) Date of Patent: Sep. 24, 2002

(54) SLEEVE COVER

(75) Inventor: Edward L. O'Neill, Oakland, CA (US)

(73) Assignee: Lucasey Manufacturing Company, Oakland, CA (US)

( * ) Notice: Subject to any disclaimer, the term of this patent is extended or adjusted under 35 U.S.C. 154(b) by 132 days.

(21) Appl. No.: 09/706,344

(22) Filed: Nov. 3, 2000

(51) Int. Cl.$^7$ ............................................... B65D 25/00
(52) U.S. Cl. ....................... 220/8; 220/592.24; 220/694
(58) Field of Search ................................ 220/8, 592.17, 220/592.18, 592.19, 592.24, 23.91, 694.1, 903, 4.02

(56) References Cited

U.S. PATENT DOCUMENTS

| | | | | |
|---|---|---|---|---|
| 4,264,388 A | * | 4/1981 | McClintock | ............ 220/683 X |
| 5,020,481 A | * | 6/1991 | Nelsen | .............. 220/592.24 X |
| 5,609,265 A | * | 3/1997 | Haberkorn et al. | ......... 220/694 |
| 6,029,615 A | * | 2/2000 | Terwilliger et al. | . 220/592.24 X |

* cited by examiner

Primary Examiner—Steven Pollard
(74) Attorney, Agent, or Firm—Niro Scavone Haller & Niro

(57) ABSTRACT

A covering system for use in connection with an appliance mount having a at least one self-closing tubular sleeve and a plurality of retaining rings. The retaining rings are adapted to engage a support structure. The sleeve wraps around the support structure and creates an inwardly directed clamping action which secures the sleeve to the rings.

2 Claims, 1 Drawing Sheet

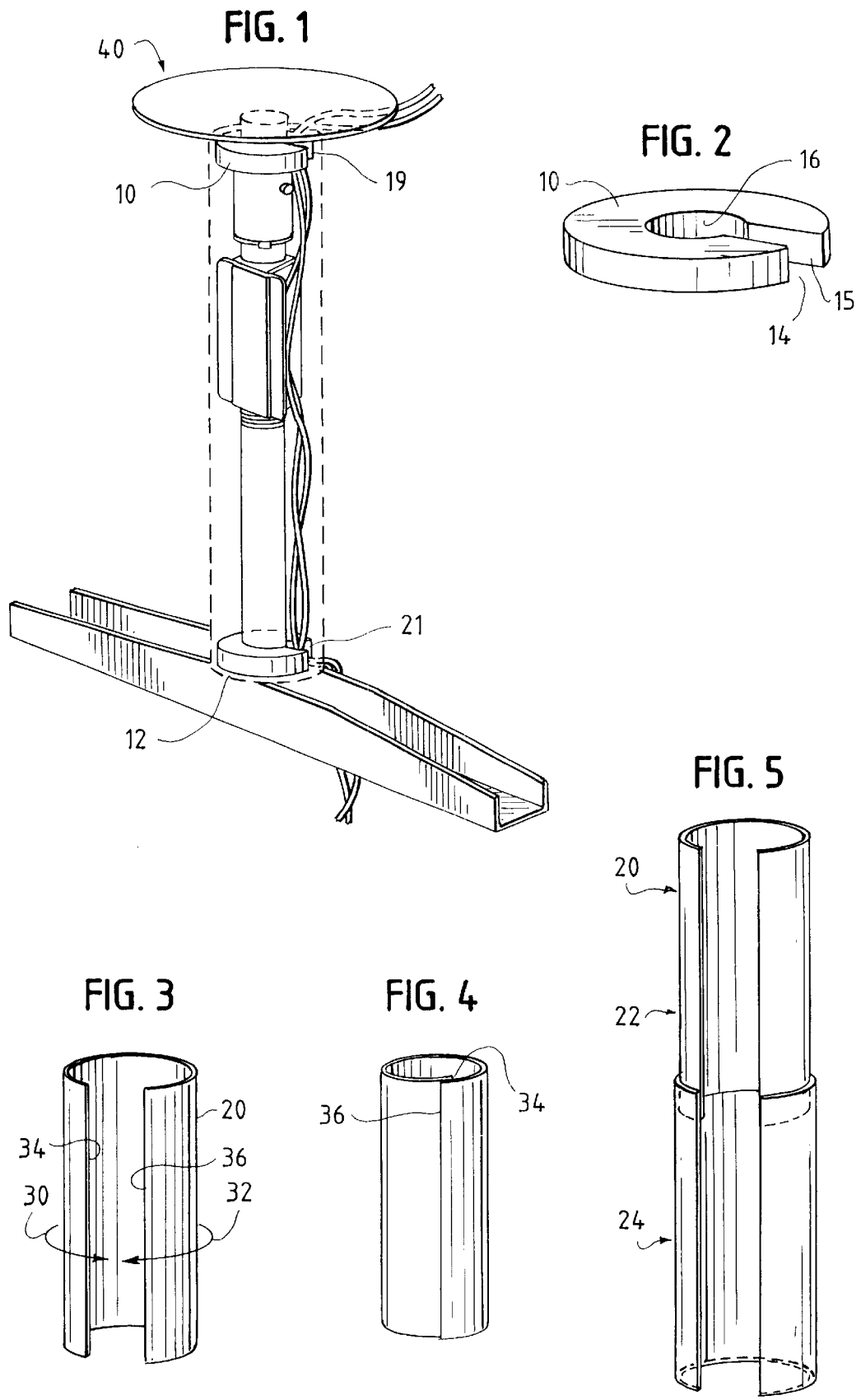

SLEEVE COVER

BACKGROUND OF THE INVENTION

The present invention concerns a covering system for use in connection with appliance mounts. More particularly, the present invention concerns a covering system which includes a dress sleeve and retaining rings which are located between a mount and yoke along a connecting member in order to create an aesthetically pleasing appearance by covering the connecting member and associated hardware and the like.

SUMMARY OF THE INVENTION

Appliance mounts are often used to affix appliances such as television screens and the like to a support surface such as a ceiling. However, the construct of such mounts often results in an unattractive appearance since the ceiling mount often consists of a ceiling flange which is fastened to a support surface and a yoke which is connected to the flange by a connecting member. Often located around the connecting member or rod is various hardware such as a cam hoist, wiring, and other structures. It is the exposure of this structure which creates a non-aesthetic appearance.

The present invention presents a solution to this problem by providing a covering system that is cost-effective, economical, easy to install with no tools required, and which creates an appearance that matches the aesthetic appearance of the mounting system. This is done by providing a plurality of rings which are attached to the connecting member or rod and hardware. The rings provide a support surface for at least one cover that wraps around the rings by an inwardly directed biasing force. This holds the sleeve in place. The outer surface of the sleeve has an appearance which matches or coordinates with the mounting system.

DESCRIPTION OF THE DRAWINGS

These and other features, objects and advantages of the present invention will become apparent from the following description and drawings wherein like reference numerals represent like elements in several views, and in which:

FIG. 1 is a perspective view of one embodiment of the invention partially assembled;

FIG. 2 is a perspective view of a retaining ring;

FIG. 3 is a perspective view of a dress sleeve in an open position;

FIG. 4 is a perspective view of a dress sleeve in a closed position; and

FIG. 5 is a perspective view of a plurality of sleeves which are telescopically engaged.

DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

As shown in FIGS. 1 and 5, the present invention consists of retaining rings 10 and 12 and a dress sleeve 20 which may be comprised of a first section 22 and a second section 24.

As shown in FIG. 2, retaining rings 10 and 12 may further include a slit 14 and aperture 16. Rings 10 and 12 may be made from polyurethane foam as well as other pliable materials known to those of skill in the art.

As shown in FIG. 3, sleeve 20 may be made of a plastic type polymer which is molded into sheets which are further processed to form tubular structures. A shown by arrows 30 and 32, forming the sections of sleeve 20 in this manner helps create an inwardly directed biasing force which results in edge 36 overlapping edge portion 34 or visa versa when in a closed position as is shown in FIG. 4.

In use with a mount 40, as shown in FIG. 1, which has been properly mounted, retaining rings 10 and 12 are first positioned on the mount in opposingly located locations. Slit 14 and aperture 16 allow the rings to be positioned around the components of the mount in a self-securing manner since internal surface 15 of the ring is biased against the support structure or components included with the mount. This permits outer edges 19 and 21 of the rings to be placed a spaced distance away from the central components of the mount.

Next, sleeve 20 is formed into an open position as shown in FIG. 3. This permits the sleeve to be placed around and into engagement with rings 10 and 12. The clamping or biasing force created by the elongated sleeve results in it being self-closing and releasably secured to the outer surfaces or edges of the rings.

As shown in FIG. 5, in an alternate embodiment, the sleeve is formed into two sections 22 and 24 which are telescopically engaged. This allows for a sleeve of greater overall length to be created and used.

To present an even more attractive appearance, the color of the sleeve may match that of the mount. In addition, the outer surface of the sleeve may be wrinkled in appearance so that it matches the powder coating found on many mounts.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A covering system for use in connection with an appliance mount comprising:

at least one self-closing, tubular sleeve;

a plurality of retaining rings;

said retaining rings adapted to encompass and releasably engage a support structure;

said sleeve adapted to wrap around said retaining rings, said sleeve creates an inwardly directed clamping action which releasably secures said sleeve to said rings.

2. A covering system for use in connection with an appliance mount comprising:

a first and second self-closing sleeve sections which are telescopically disposed;

a plurality of retaining rings adapted to self-secure to a support structure;

said sleeves wrap around said support structure and engage said rings by creating an inwardly directed clamping action which secures said sleeves to said rings.

* * * * *